US012584579B2

(12) United States Patent
Kirsten et al.

(10) Patent No.: US 12,584,579 B2
(45) Date of Patent: Mar. 24, 2026

(54) INTERFACE SYSTEM FOR CONNECTING TROLLEYS

(71) Applicant: Airbus Operations GmbH, Hamburg (DE)

(72) Inventors: Robert Kirsten, Hamburg (DE); Oliver Kiehne, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 135 days.

(21) Appl. No.: 18/685,308

(22) PCT Filed: Aug. 23, 2022

(86) PCT No.: PCT/EP2022/073390
§ 371 (c)(1),
(2) Date: Feb. 21, 2024

(87) PCT Pub. No.: WO2023/025754
PCT Pub. Date: Mar. 2, 2023

(65) Prior Publication Data
US 2024/0351685 A1       Oct. 24, 2024

(30) Foreign Application Priority Data
Aug. 23, 2021       (EP) ..................................... 21192637

(51) Int. Cl.
*F16L 39/00*       (2006.01)
*B64D 11/00*       (2006.01)
(Continued)

(52) U.S. Cl.
CPC .......... *F16L 39/00* (2013.01); *B64D 11/0007* (2013.01); *B64D 11/04* (2013.01); *F16L 39/04* (2013.01)

(58) Field of Classification Search
CPC .... B64D 11/0007; B64D 11/04; F16L 27/026; F16L 39/00; F16L 39/04
See application file for complete search history.

(56) References Cited

U.S. PATENT DOCUMENTS

| | | | | |
|---|---|---|---|---|
| 5,465,660 | A | * | 11/1995 | Conti ..................... B64D 11/04 100/48 |
| 9,586,685 | B2 | | 3/2017 | Burd |
(Continued)

FOREIGN PATENT DOCUMENTS

| CN | 1306163 A | 8/2001 |
|---|---|---|
| CN | 206976852 | 2/2018 |
(Continued)

OTHER PUBLICATIONS

International Search Report and Written Opinion for Application No. PCT/EP2022/073390 dated Oct. 6, 2022.
(Continued)

*Primary Examiner* — David Bochna
(74) *Attorney, Agent, or Firm* — KDW Firm PLLC

(57)       ABSTRACT

An interface system for cabin trolleys for a vehicle includes a first interface device attachable to a monument, second interface device attachable to a cabin trolley, the first interface device including a first electrical port, first hot water port and first cold water port, a first guide element and first locking element, the second interface device including a second electrical port, second hot water port and second cold water port, a second guide element and second locking element, the first interface device and second interface device complementary to each other, so the first electrical port, first hot water port and first cold water port, and second electrical port, second hot water port and second cold water port connect to each other, the first guide element and second guide element engageable to guide the interface devices into
(Continued)

connecting position, and the locking elements can releasably lock to arrest the interface devices.

18 Claims, 5 Drawing Sheets

(51) Int. Cl.
  *B64D 11/04*   (2006.01)
  *F16L 39/04*   (2006.01)

(56)     References Cited

U.S. PATENT DOCUMENTS

| | | | |
|---|---|---|---|
| 2008/0001031 A1 | 1/2008 | Doebertin | |
| 2008/0120187 A1 | 5/2008 | Wesley | |
| 2012/0217343 A1* | 8/2012 | Koschberg | B64D 11/04 |
| | | | 29/469 |
| 2013/0082140 A1 | 4/2013 | Ehlers | |
| 2013/0280953 A1 | 10/2013 | Radeke | |
| 2015/0059363 A1* | 3/2015 | Burd | B64D 11/0007 |
| | | | 62/3.62 |
| 2015/0266580 A1* | 9/2015 | Lee | B64D 11/0007 |
| | | | 222/1 |
| 2018/0134391 A1* | 5/2018 | Spille | B64D 11/0007 |
| 2018/0273073 A1* | 9/2018 | Martin | B60P 7/135 |
| 2018/0338666 A1* | 11/2018 | Seewang | B64D 11/04 |
| 2019/0061297 A1* | 2/2019 | Lutzer | B64D 11/0007 |
| 2020/0317344 A1 | 10/2020 | Bauer | |
| 2020/0339262 A1* | 10/2020 | Claflin | B64D 11/04 |

FOREIGN PATENT DOCUMENTS

| | | |
|---|---|---|
| DE | 102013006145 A1 | 10/2014 |
| WO | 2013136283 A2 | 9/2013 |
| WO | 2015142726 A1 | 9/2015 |

OTHER PUBLICATIONS

European Search Report for Application No. 21192637 dated Feb. 3, 2022.

* cited by examiner

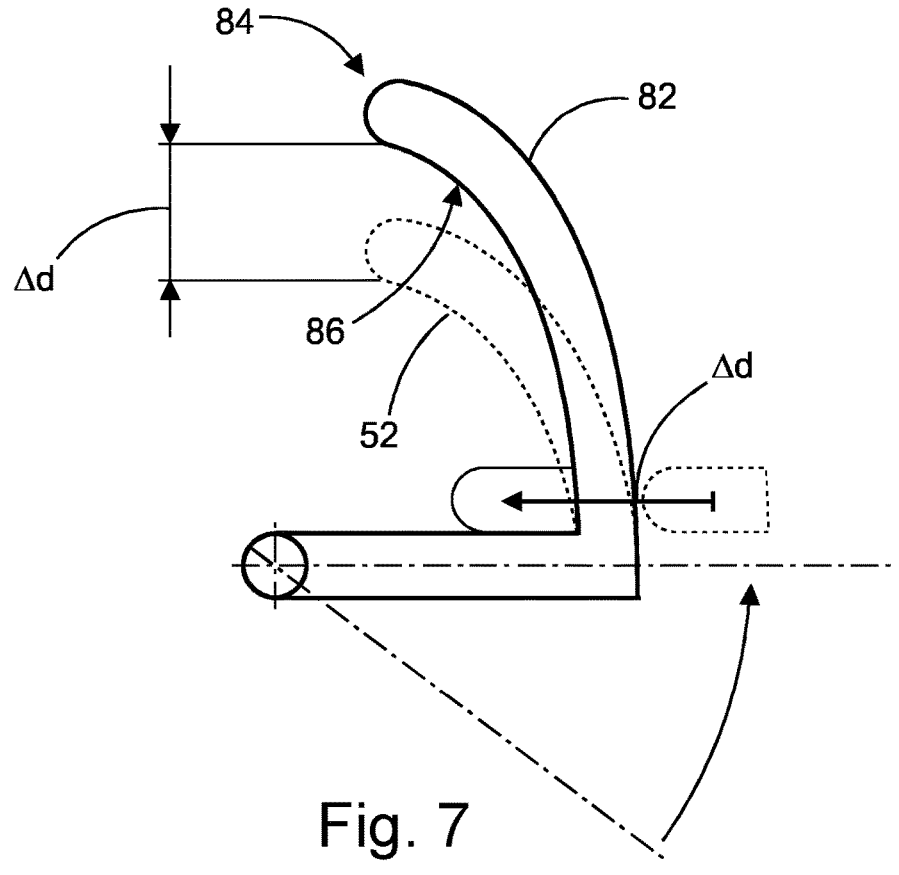
Fig. 7
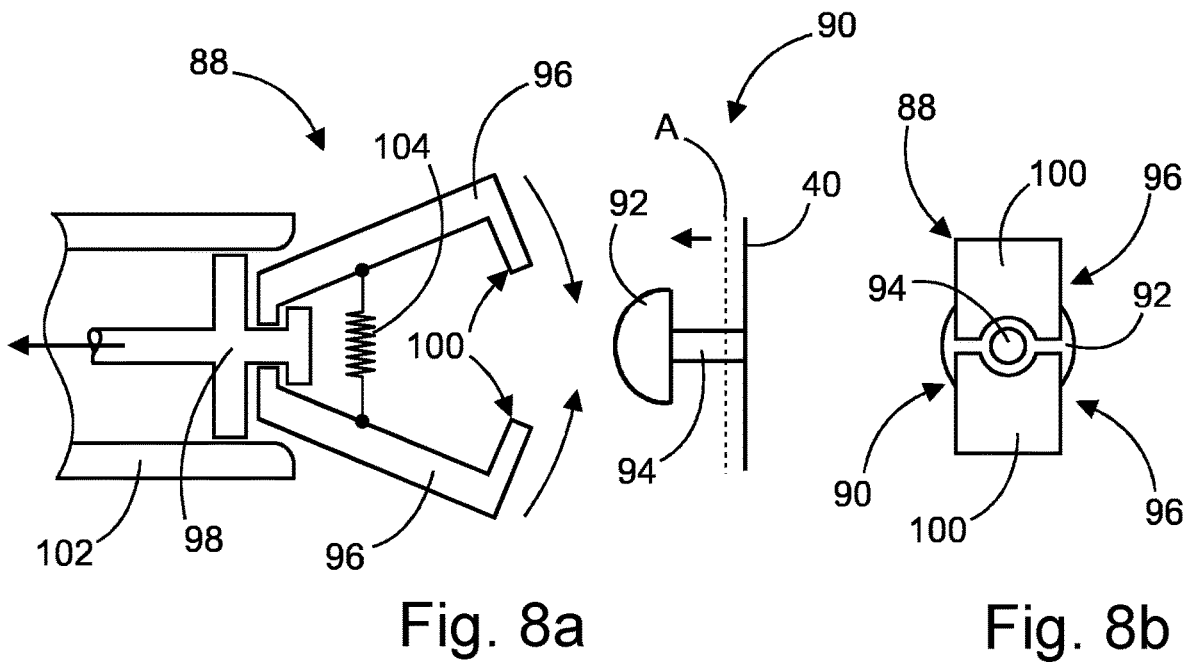
Fig. 8a                                        Fig. 8b

INTERFACE SYSTEM FOR CONNECTING TROLLEYS

This application is a national stage filing under 35 U.S.C. 371 of pending International Application No. PCT/EP2022/073390, filed Aug. 23, 2022, which claims priority to EP patent application Ser. No. 21/192,637.3, filed Aug. 23, 2021, the entirety of which applications are incorporated by reference herein.

TECHNICAL FIELD

The invention relates to an interface system for connecting trolleys inside a cabin of a vehicle, a galley system having a galley and a trolley, as well as an aircraft.

BACKGROUND OF THE INVENTION

Inside cabins of commercial vehicles, often a plurality of equipment installations is provided for serving passengers to make traveling comfortable. For example, aircraft cabins, especially for long-haul flights, comprise galleys, in which food and beverages are prepared and distributed to cabin trolleys. For example, the galley comprises a water supply connected to a supply tank storing fresh water, which is supplied to one or a plurality of appliances in the galley. Furthermore, electrical consumers, such as ovens, water boilers or similar, are installed in the galley and are frequently used when meals are prepared.

Standalone water dispensing trolleys exist, which comprise an internal water tank and a battery driven pump, which is capable of dispensing water from the internal water tank to a faucet.

SUMMARY OF THE INVENTION

Filling water into a supply tank in a cabin trolley, recharging a battery, operating a trash compactor or other devices inside a cabin trolley requires connecting the trolley to a variety of supply ports. However, this is cumbersome, as external hoses or cables need to be attached to dedicated ports in the cabin, which need to be retracted into or stowed in the respective trolley after use. Other connections to water and electricity consuming devices on board the vehicle are usually prepared by mechanics and are not intended for a merely temporary use.

It is thus an object of the invention to provide a trolley or a cabin system that is capable of providing a simple and temporary connection between water and/or electricity consuming devices and the respective sources on board the vehicle.

This object is met by the interface system according to claim one. Advantageous embodiments and further improvements may be gathered from the subclaims and at the following description.

An interface system for cabin trolleys for a vehicle is proposed, comprising a first interface device attachable to a monument inside the cabin, a second interface device attachable to a cabin trolley, wherein the first interface device comprises at least one of a first electrical port, and a first water port, wherein the first interface device comprises a first guide element and at least one first locking element, wherein the second interface device comprises at least one of a second electrical port, and a second water port, wherein the second interface device comprises a second guide element and at least one second locking element, wherein the first interface device and the second interface device are designed complementary to each other, such that the at least one of a first electrical port, a first water port, and the at least one of a second electrical port, and a second water port connect to each other in a connecting position, wherein the first guide element and the second guide element are designed to engage with each other to guide the first interface device and the second interface device into the connecting position, and wherein the first locking element and the second locking element are designed to releasably lock each other to arrest the first interface device and the second interface device in the connecting position.

Thus, a pair of interface devices is provided, that are designed complementary to each other. The first interface device is intended for an installation to a monument inside the vehicle. For example, the monument is a galley monument, which may comprise water and electricity sources that may be connected to the first interface device. The first interface device may comprise a connection side, at which the different first ports are arranged, as well as an installation side, which is facing to a wall or frame of the monument, where the respective sources are connected to the respective first ports.

The second interface device in turn is intended for being attached to or inside a trolley. The second interface device may also comprise a connection side, at which the second ports are arranged, as well as an installation side, which faces to the interior of the trolley. At the installation side, connections to water and/or electricity consumers inside the trolley is made. It is clear that the installation height of the first interface device and the second interface device match, such that the first and second ports can engage each other when the trolley is advanced to the monument.

The first interface device and second interface device are designed to provide a guiding function, with which the first and second ports correctly align to each other when advancing the interface devices towards each other. Misalignments, which may lead to potentially damage-inducing partial contacts between the first and second ports, can thus be prevented. Furthermore, the first interface device can be locked, i.e latched, to the second interface device by locking the first locking element to the second locking element to maintain their positions and the connections even in case of relative motion between the monument and the trolley.

If the respective vehicle is realized as a commercial aircraft, it is recommended to design the interface system for the use with trolleys according to relevant standards, for example the Atlas standard. This may include half-size trolleys and full-size trolleys.

Thus, the respective trolley may simply be moved to or into the respective monument, where the first guide element and the second guide element engage each other to guide the first interface device precisely to the second interface device. Automatically and/or selectively, i.e. on demand, both interface devices can be locked to each other. Then, water and/or electricity can be used inside the trolley by the respective installations.

This allows to flexibly create trolleys that at least temporarily use water and/or electricity inside, without requiring a complicated connection or without bulky connection lines. Also, simply by stowing the respective trolley in a dedicated trolley parking space, an automatic connection can be provided.

The first water port and the respective second water port may be designated for supplying/receiving hot water or cold water. It may be possible to use two pairs of first water port and second water port to supply/receive both cold water and hot water.

In an exemplary embodiment, at least one of the at least one first locking element and the at least one second locking element is movable into an engagement position, and into an operation position, wherein the respective first locking element and the respective second locking element are designed to engage or disengage each other in the engagement position and to pull the first interface device and the second interface device towards each other when moving the respective locking element to the operation position. Connecting the first interface device and the second interface device may require a certain force to overcome a mechanical resistance between the first and second ports. The mechanical resistance depends on the type of connectors used in the respective ports. For example, the water ports may comprise a sealing ring and a spring-loaded valve. Also, electrical connectors may comprise a mechanical resistance that needs to be overcome when plugging the first electrical port and second electrical port together. To simplify the connection, the interface systems may comprise a pair of locking elements that are able to engage each other in a relative position of the first and second interfaces, in which the first and second ports are not connected yet. This position is referred to as engagement position. After engaging, at least one of the locking elements is able to pull the respective other locking element, such that the first interface device and the second interface device advance. The process of connecting the first and second interfaces is thus assisted and facilitated.

In an exemplary embodiment, the second locking element comprises a movable catch adapted to engage the first locking element. Hence, at least a simple latching function can be realized. The catch is an element that is movable into a locking position or a release position. It has a shape that allows an engagement with the first locking element. The catch can thus be used for engaging the first locking element with the second locking element. The first locking element may comprise a recess, a protrusion, an indentation, or another shape feature, which is able to engage with the catch in its locking position. The catch may be linearly movable or swivable. The activation element may be any element that is capable of providing a movement to the catch. This may be mechanically, magnetically electrically or any combination thereof. As explained further below, the latching function may be designed in a way to also provide the connection assistance mentioned further above.

In an exemplary embodiment, the interface system further comprises an activation element attachable to the trolley, wherein the activation element is coupled with the at least one second locking element to move the second locking element. Thus, a user is able to handle the activation element to move the respective second locking element. The activation element may be placed at a convenient location of the trolley, such as a section near the top, or near the bottom side. By providing an activation element, which may be a lever, a pedal, a button connected to an actuator, or any other type of activation element, the user can easily control the motion of the respective second locking element.

Exemplarily, the activation element may be a foot pedal of the trolley, which is coupled with the second locking element through a linkage. Thus, a user, for example a cabin attendant in an aircraft cabin, pushes the trolley into the respective trolley parking space, where the first interface device and the second interface device connect to each other, wherein after or before reaching the connecting position, the user activates the foot pedal. This is a common process in the handling routine of a cabin attendant and leads to arresting the trolley in the trolley parking space. By slightly modifying a trolley to include said linkage and second locking element to a brake pedal of a trolley, a locking between the first locking element and the second locking element and/or a pulling motion between the first interface device and the second interface device can be provided.

It is conceivable, that the first guide element and/or the second guide element comprises at least one guide pin, wherein the other one of the first guide element and the second guide element comprises at least one recess for receiving the at least one guide pin. It is also conceivable, that not only a single guide pin, but two guide pins are used, which correspond to two recesses. It is also conceivable, that each interface device comprises a single guide pin and single recess. It may be preferred if the first interface device comprises two guide pins, that protrude from the connection side of the first interface device. They may be arranged at two opposite ends of the first interface device. The second interface device then comprises two recesses, which are positioned at corresponding positions. The use of guide pins and recesses is very effective to align the interface devices. The guide pins may be slightly pointed, which simplifies their insertion into the respective recesses.

The first ports may protrude from the first interface device, wherein the first interface device comprises guide pins as a first guide element, wherein the guide pins protrude further from the first interface device than the first ports. Thus, it can be prevented that wrongly aligned or completely unaligned ports contact each other. The guide pins are the first elements that contact the second interface device and only allow a further movement if the guide pins can enter the recesses. Thereby, the first and second ports are protected from being damaged.

Exemplarily, the at least one first locking element comprises a latch, that protrudes from the first interface device. The latch may be designed similar to a buckle tongue and may comprise a flat component, e.g. from a sheet metal material, and a central recess inside its main surface. The latch may also provide a guiding function and may serve to protect the ports from contacting each other if the first interface device and the second interface device are not precisely aligned to each other. For example, the second interface device may comprise a complementary designed slit or recess, into which the latch may enter, when the trolley is aligned. Particularly in combination with the above-mentioned catch as a second locking element, a simple and very effective locking can be produced.

The second interface device may comprise at least one cover flap, that is swivably mountable on the trolley and is positionable into a closed and an opened position, wherein the at least one cover flap covers the second interface device in the closed position. The second connection device may thus be protected from damage or dirt if the flap is in a closed position. In the opened position of the at least one cover flap, the second interface device may provide a connection to the first interface device. Advantageously, the at least one cover flap is designed to completely cover the second interface device in its closed position. It is conceivable that the second interface device is arranged inside a cavity of the trolley.

Preferably, the at least one cover flap is spring-loaded, such that it permanently urges into the closed position. It is conceivable, that first guide element and/or a respective first locking element provide an initial contact with the flap, when the trolley is positioned directly in front of the first interface device but not completely inside the respective parking space. By further advancing the trolley, the first guide element and/or the respective first locking element continue to act on the flap, such that it swivels into an open position against the action of the respective spring. Resultantly, access is given to the second interface device, such that the first and second interface devices engage. In the connecting position, the trolley is arrested and the connection remains. When the respective first locking element and second locking element disengage and the trolley is pulled out of the parking space, the flap may swivel back into its closed position, such that the second interface device is again protected from damages and dirt.

The first interface device may further comprise a wheel guide placeable at a bottom side of the monument, wherein the wheel guide is designed to receive and guide wheels of a respective trolley to at least pre-align the first interface device and the second interface device. In the region underneath the first interface device, the wheel guide may comprise a ramp-like curved shape that conforms the shape of wheels of the respective trolley. Also, in this region cutouts for receiving the wheels may be placed. The wheel guide may extend up to a front end of the trolley parking space and comprise lateral delimitations. Hence, when the trolley is advanced into the parking space, the wheels are guided in the wheel guide to steer the trolley to a more precise end position. The wheel guide provides a base surface having a precisely defined relative height to the first interface device, such that the second interface device is placed in a correct height.

Preferably, the first and second ports for hot or cold water are provided as quick connectors, which are self-closing. This improves the safety and reliability of the interface system, as a user does not need to close or open valves inside the respective trolley to activate or deactivate a flow of water from and to the trolley. If first and second water ports are engaging, they automatically provide a fluid connection, while in a disengaged state they automatically close. Hence, water is prevented from running out of the respective ports in the disengaged state.

The first interface device may comprise elastic mounts for tolerance compensation. The elastic mounts may include a rubber element, e.g. a cylindrical mount that is made from rubber, which holds the first interface device at the respective monument. A slight movement, depending on the material choice of the elastic mounts, is possible.

The invention further relates to a galley system of an aircraft, comprising at least one galley monument having at least one trolley parking space, and at least one trolley designed to be insertable into the parking space, wherein the galley system further comprises an interface system according to the above description, wherein the first interface device is arranged in the at least one trolley parking space, wherein the second interface device is arranged on the trolley, wherein the installation height above a cabin floor of the first interface device and of the second interface device correspond to each other and wherein a lateral position of the first interface device in the trolley parking space and of the second interface device on the trolley match. It is conceivable, that a plurality of trolley parking spaces is provided, wherein a single, a plurality of or each comprise a first interface device.

The trolley may comprise a water tank and a dispensing unit, wherein the water tank is connected to a second cold water port and/or a second hot water port, and wherein the dispensing unit is coupled with a battery coupled to the second electrical port. Hence, a water dispensing trolley is easily providable with fresh hot or cold water, wherein the battery for the dispensing unit may be constantly recharged through a charging control unit. Consequently, the trolley is very user-friendly and may be frequently used in the respective aircraft cabin.

It is advantageous, if the trolley parking space comprises a key block, wherein the key block is arranged in the trolley parking space in such a position that it blocks advancing of the trolley to the first interface device unless the trolley comprises a correspondingly positioned groove that allows the key block to pass along the groove. Thus, a full insertion of common trolleys that do not comprise a second interface device, can be prevented. If a corresponding groove is not present, the trolley will contact the key block and will not reach further into the parking space. Hence, a contact of the first guide element as well as the first ports as well as damages thereto can be prevented.

Lastly, the invention relates to an aircraft having a cabin comprising at least one interface system and/or at least one galley system according to the above.

BRIEF DESCRIPTION OF THE FIGURES

In the following, the attached drawings are used to illustrate exemplary embodiments in more detail. The illustrations are schematic and not to scale. Identical reference numerals refer to identical or similar elements. They show:

FIG. 7 shows a modified catch.

FIGS. 8$a$ and 8$b$ show another exemplary embodiment of locking devices.

DETAILED DESCRIPTION OF EXEMPLARY EMBODIMENTS

Figure 1:
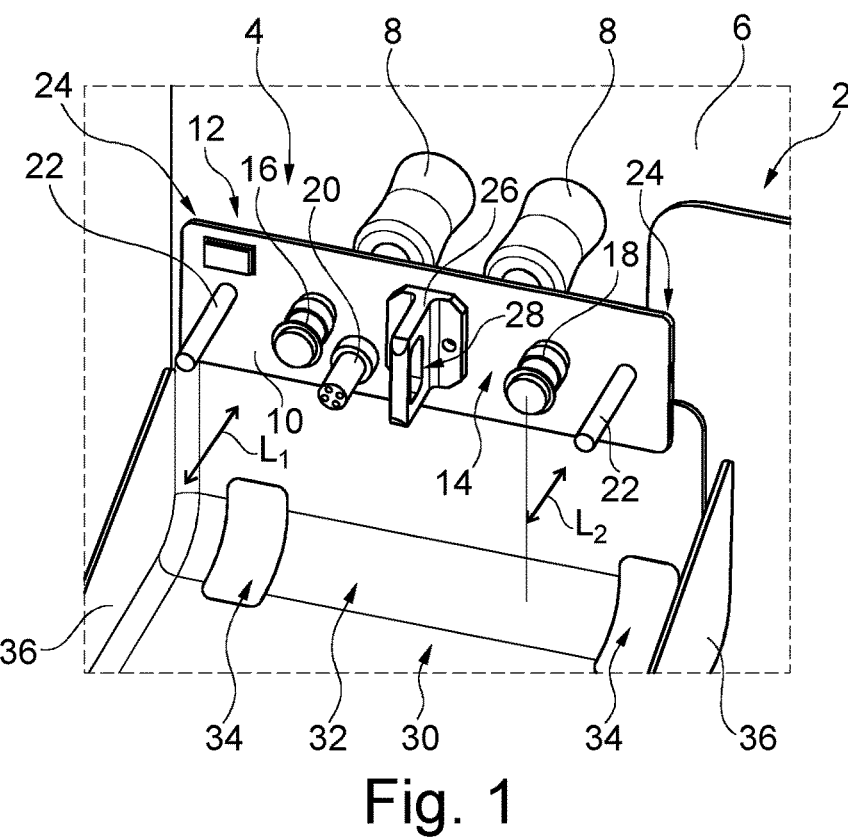
FIG. 1 a detail of a galley monument with a first interface device.

FIG. 1 shows a part of a galley monument 2. Here, a first interface device 4 is attached to the galley monument 2 on a rear wall 6 of a trolley parking space. Here, two elastic mounts 8 are attached to the rear wall 6 and carry a base plate 10 comprising an installation side 12 and a connection side 14. On the installation side 12, which faces the rear wall 6, the two mounts 8 are provided. On the opposite connection side 14, a first cold water port 16, a first hot water port 18 and a first electrical port 20 are provided at a distance to each other and protruding from the base plate 10, i.e. the connection side 14. In addition, two guide elements in the form of guide pins 22 are provided, which also protrude from the connection side 14 with a length $L_1$. They are arranged at two opposite lateral edges 24 and protrude further from the connection side 14 than the ports 16, 18 and 20, which exemplarily have a length $L_2$ that is lower than $L_1$. In a central region, a first locking element 26 in the form of a latch with a central recess 28 is mounted on the base plate 10 and protrudes perpendicular thereto. The first locking element 26 may protrude as far from the connection side 14 as the guide pins 22.

Figure 2:
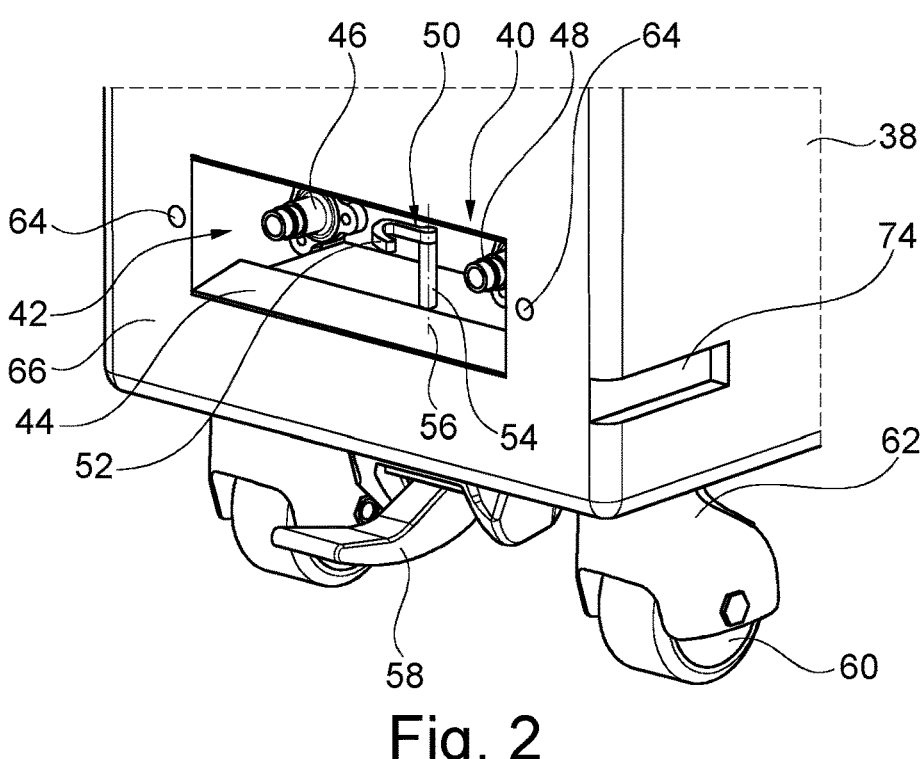
FIG. 2 a detail of a trolley with a second interface device.

The first interface device 4 is provided for connecting a second interface device installed on a trolley as shown in FIG. 2. The first interface device 4 further comprises a wheel guide 30, which is arranged at a bottom of the galley monument 2 and is designed to receive and guide wheels of the respective trolley to at least pre-align the first interface device 4 and the second interface device. Here, it comprises a curved surface 32 with two cutouts 34 for receiving the wheels in an end position. The wheel guide 30 is further laterally limited by lateral end sheets 36 that guide the wheels and their support.

FIG. 2 shows a trolley 38 having a second interface device 40 arranged at a lower part of the trolley 38. In the example shown the second interface device 40 is arranged in a cavity 42, which can be closed by two spring-loaded and swivably supported cover flaps 44. The second interface device 40 comprises a second hot water port 46, a second cold water port 48, a second electrical port (not shown) as well as a second locking element 50.

The second locking element 50 comprises a catch 52, which can be moved through swiveling a shaft 54, on which the catch 52 is placed, about a rotary axis 56. It is conceivable, that the catch 52 may be moved through stepping on a brake pedal 58, which may be provided at a front side and a rear side of the trolley 38. Here, a linkage is arranged between the brake pedal 58 and the shaft 54.

By advancing the trolley 38 into the galley monument 2, i.e. into a trolley parking space, the second interface device 40 advances to the first interface device 4. Through the wheel guide 30, wheels 60 and wheel casings 62 reach the wheel guide 30 and the wheel casings 62 slide along the lateral end sheets 36. The guide pins 22 may then enter recesses 64 arranged in a front surface 66 of the trolley 38 and thus provide a guiding function of the second interface device 40 to the first interface device 4.

During this movement, the first locking element 26 pushes the cover flaps 44 into the cavity 42, such that the cavity 42 opens and the second interface device 40 becomes accessible. When reaching the final position, the first ports 16, 18 and 20 are coupled with the second ports 46, 48 and the second electrical port. When stepping on the brake pedal 58, the catch 52 of the second locking element 50 rotates to enter the central recess 28 of the first locking element 26. Thus, the trolley 38 as well as the second interface device 40 are locked to the galley monument 2 and the first interface device 4, respectively.

Figure 3:
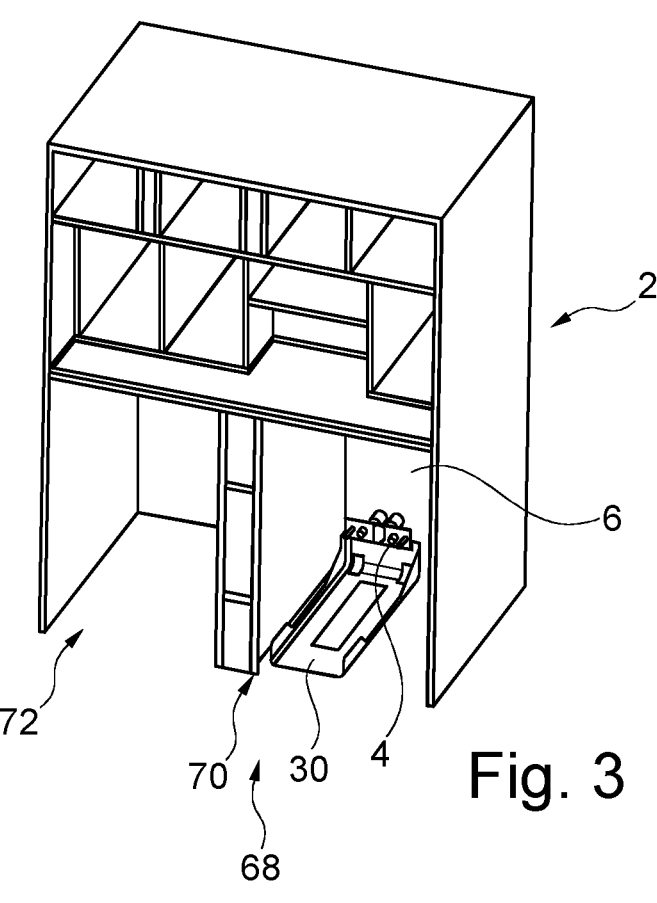
FIG. 3 the galley monument in an overview.

FIG. 3 shows the galley monument 2 in an overview. Here, a trolley parking space 68 is shown, which is equipped with the first interface device 4 and the wheel guide 30. The wheel guide 30 may extend from the rear wall 6 almost up to a front opening contour 70 of the galley monuments 2. While other trolley parking spaces 72 are provided, only one of these is equipped with the first interface device 4 and the wheel guide 30.

In FIGS. 5a to 5e, the process of inserting the trolley 38 into the respective trolley parking space 68 is shown in more detail. The combination of the galley monument 2 and the trolley 38 may be considered a galley system 77 according to the above description.

Figure 5A:
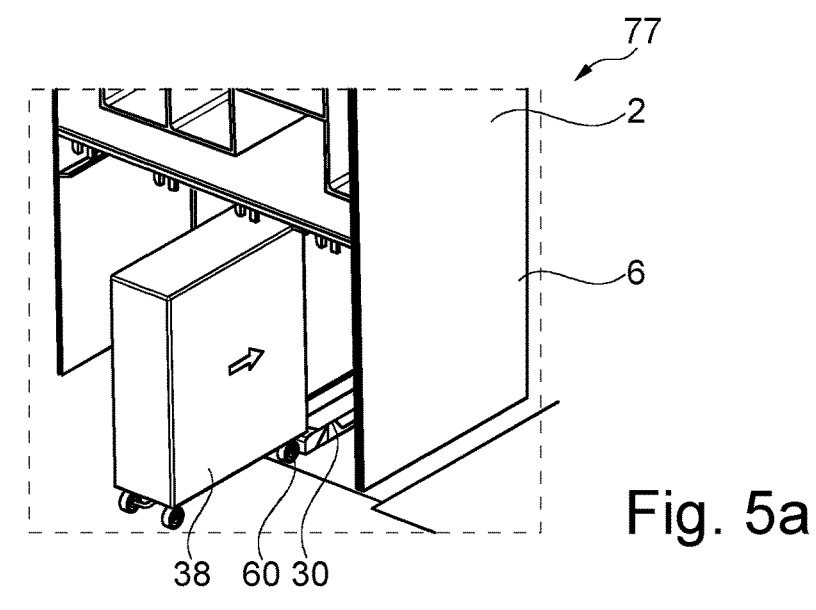
FIG. 5$a$-5$e$ moving the trolley into the galley monument.
Figure 5B:
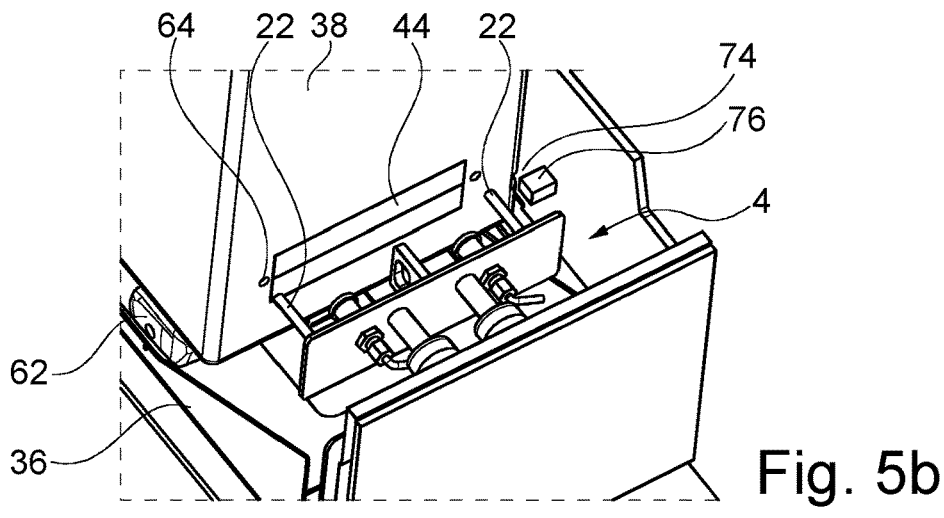

Here, FIG. 5a shows the trolley 38 at the beginning of the insertion. Wheels 60 reach the wheel guide 30 and the trolley 38 advances towards the rear wall 6. In FIG. 5b, the cover flaps 44 are still closed and the guide pins 22 are at a small distance to the recesses 64. The wheel casings 62 slide along the lateral end sheets 36, such that the guide pins 22 and the recesses 64 directly advance each other. Here, a connection is not provided yet.

Figure 4:
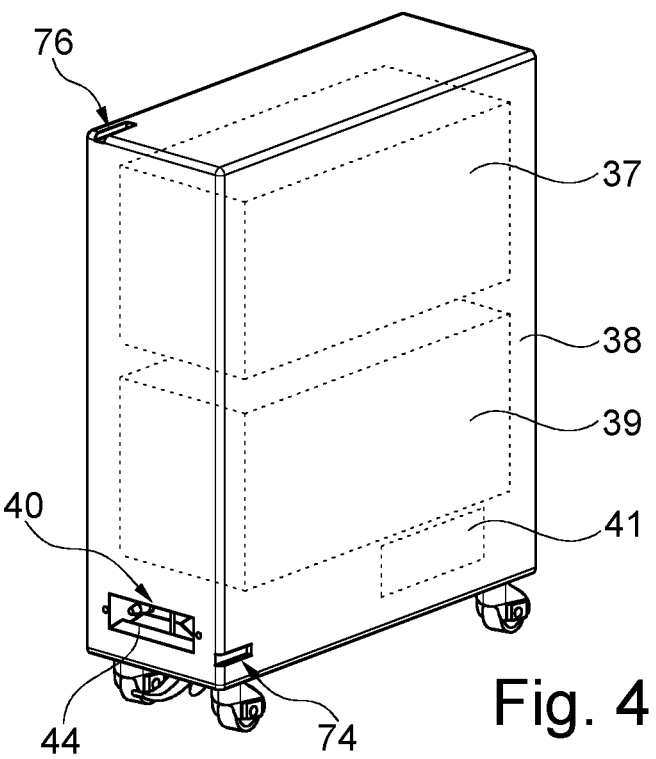
FIG. 4 the trolley in an overview.

As already indicated in FIG. 2, the trolley 38 may comprise lateral grooves 74, which are additionally shown in FIG. 4. There, grooves 74 may also be provided on a top side of the trolley 38. They serve for engaging with a key block 76 that is structurally fixed inside the trolley parking space 68 near the rear wall 6. The key block 76 would block any other trolley 38, which does not have a corresponding groove 74, from reaching the first interface device 4. This prevents damaging the first interface device 4 through insertion of common trolleys.

Inside the trolley 38, there may be provided a water tank 37 for hot water, a water tank 39 for cold water as well as at least one pump unit 41 for dispensing water from one of the tanks 37 and 39. The trolley 38 may thus be a dispensing trolley.

Figure 5C:
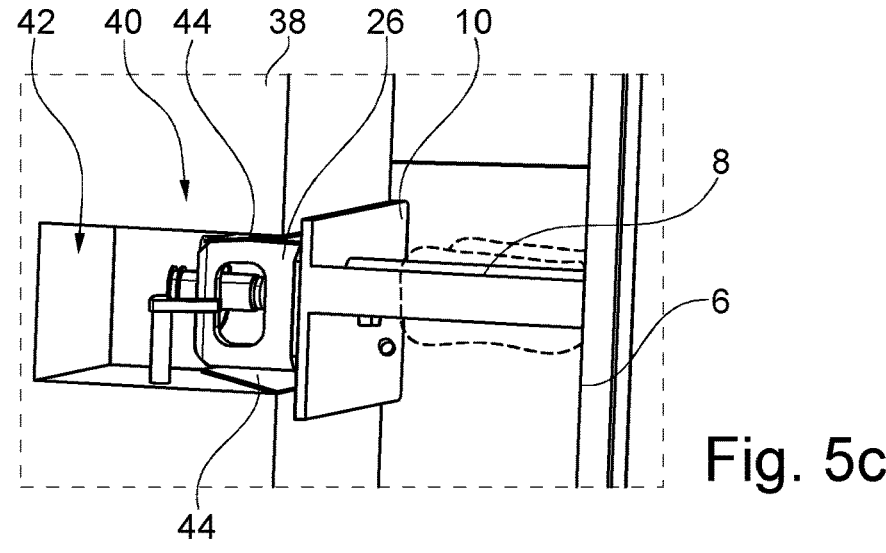
Figure 5D:
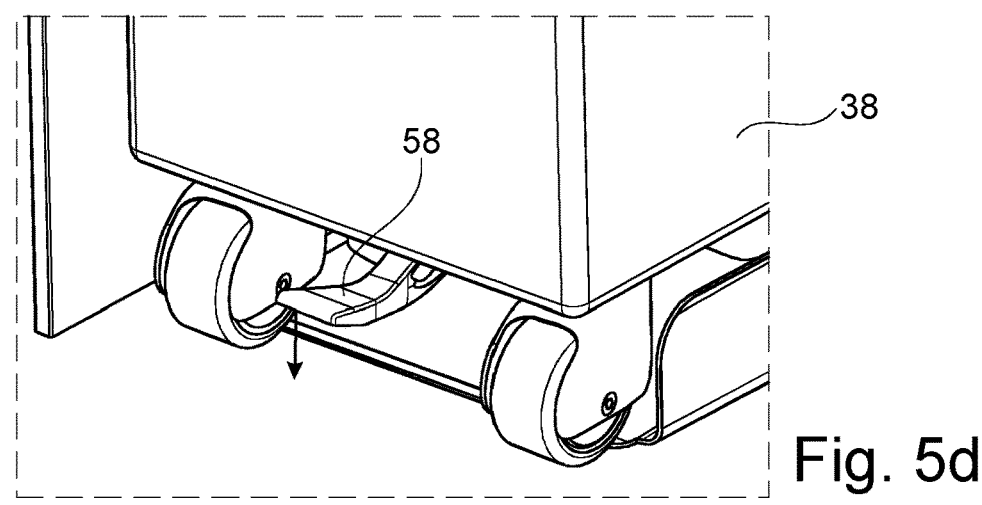
Figure 5E:
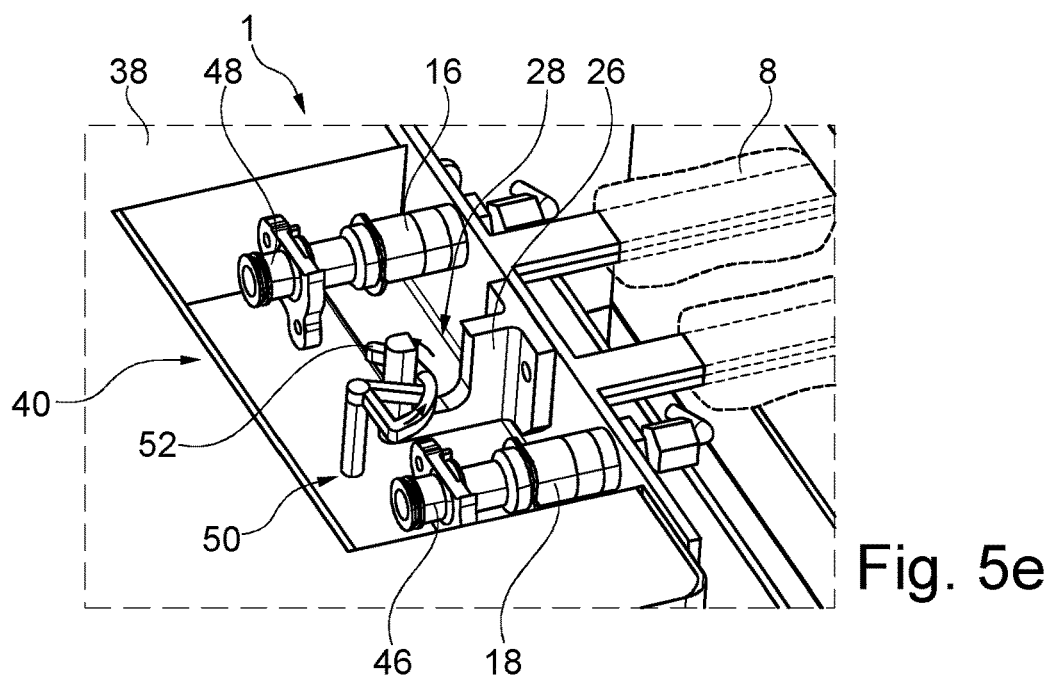

FIG. 5c shows the trolley 38 reaching the final position, such that the first locking element 26 pushes the cover flaps 44 into the cavity 42, such that the second interface device 40 is accessible. As shown in FIG. 5d, the brake pedal 58 can be pressed, such that the catch 52 rotates and engages the central recess 28 of the first locking element 26, as illustrated in FIG. 5e. Thus, the first locking element 26 and the second locking element 50 lock each other. The first cold water port 16 is connected to the second cold water port 48 and the first hot water port 18 is connected to the second hot water port 46. The combination of the first interface device 4 and the second interface device 40 may be considered an interface system 1 according to the above description.

Figure 6:
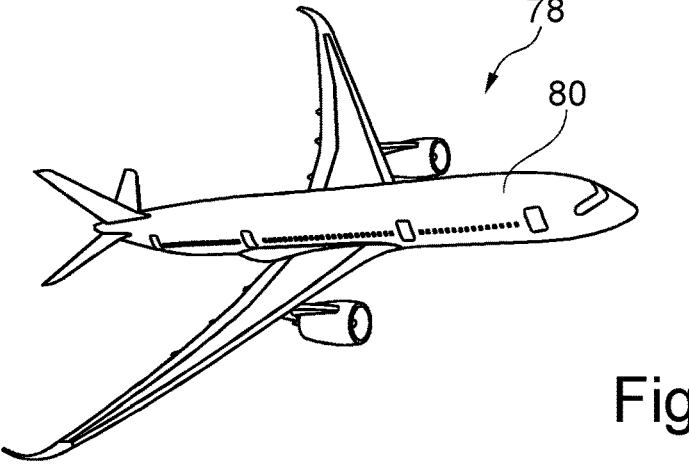
FIG. 6 an aircraft.

In addition, FIG. 6 shows an aircraft 78 having a cabin 80, into which a galley system 77, as shown in FIG. 5a, and/or an interface system 1 as shown in FIG. 5c, is provided.

FIG. 7 shows a modified catch 82, which is based on the catch 52 shown in FIG. 5e. Here, it is indicated that the catch 52 (dashed lines) has a constant radius of curvature, such that it engages with the respective first locking element 26, which is particularly designed in the form of a latch, if both interface devices 4 and 40 are in the connecting position only. The modified catch 82 has a radius of curvature that increases in a further distance to the rotary axis 56, such that distances of the outer ends of both catches 52 and 82 to the rotary axis 56 differs. This difference is indicated with Δd. Thus, the first locking element 26, e.g. in the form of a latch, can be engaged by an outer end 84 of the catch 82 if the interface devices 4 and 40 are distanced by Δd. When rotating the catch 82, the latch travels along an inner arc surface 86 of the catch 82. Due to the decreasing radius of curvature, the latch 26 is urged further to the rotary axis 56. In an exemplary embodiment, the latch 26 and thus, the first interface device 4, may travel along the distance Δd. Resultantly, the connection process for connecting the interface devices 4 and 40 is assisted.

FIG. 8a shows another exemplary embodiment of a first locking element 88 and a second locking element 90. Here, the second locking element 90 is shown as a pin having a radially protruding head portion 92, which is exemplarily shaped as a mushroom head. The head portion is placed on a shaft 94 that protrudes away from the second interface device 40. The first locking element 88 exemplarily comprises a pair of gripping bodies 96 that are supported in a plier-like manner on a support body 98. The gripping bodies 96 each comprise a radial protrusion 100 at an axial end that faces away from the support body 98. The radial protrusions 100 point to the respective other gripping body 96. The gripping bodies 96 are shaped to reach onto the shaft 94 and to come in axial contact with the head portion 92. To achieve this, the support body 98 is exemplarily arranged in a cylindrical bushing 102 and may be axially moved inwardly. The bushing 102 is designed in such a way that the gripping bodies 96 need to advance each other in order to fit into the bushing 102. If the head portion 92 is arranged somewhere between the gripping bodies 96, it will be gripped and pulled towards the bushing together with the gripping bodies 96. If the support body 98 is moved into the cylindrical bushing 102 as far as possible or desired, the interface devices 4 and 40 are in an operating position, in which the first and second ports are connected to be operated. Thus, besides locking/latching the interface devices 4 and 40 to each other, also their connection is assisted.

To urge the gripping bodies 96 into an engagement position, which is shown in FIG. 8 and in which the radial protrusions 100 are arranged at a distance to each other, a spring element 104 is exemplarily arranged between the gripping bodies 96.

FIG. 8*b* shows the gripping bodies 96 radially advanced to the shaft 94 and in flush contact with the head portion 92. The direction of view of this illustration is from a plane A behind the head portion 92 as indicated in FIG. 8*a*.

REFERENCE NUMERALS

1 interface system
2 galley monument
4 first interface device
6 rear wall
8 mount
10 base plate
12 installation side
14 connection side
16 first cold water port
18 first hot water port
20 first electrical port
22 guide pin/first guide element
24 lateral edge
26 first locking element/latch
28 central recess
30 wheel guide
32 curved surface
34 cutout
36 lateral end sheet
37 water tank for hot water
38 trolley
39 water tank for cold water
40 second interface device
41 pump unit/dispensing unit
42 cavity
44 cover flap
46 second hot water port
48 second cold water port
50 second locking element
52 catch
54 shaft
56 rotary axis
58 brake pedal
60 wheel
62 wheel casing
64 recess
66 front surface
68 trolley parking space
70 front opening contour
72 other trolley parking space
74 groove
76 key block
77 galley system
78 aircraft
80 cabin
82 catch
84 outer end
86 inner arc surface
88 first locking element
90 second locking element
92 head portion
94 shaft

96 gripping body
98 support body
100 radial protrusion
102 cylindrical bushing
104 spring element
$L_1$ length guide pin
$L_2$ length first ports
$\Delta d$ difference in distances

The invention claimed is:

1. An interface system for cabin trolleys for a vehicle, comprising:
   a first interface device attachable to a monument inside a cabin;
   a second interface device attachable to a cabin trolley;
   wherein the first interface device comprises at least one of a first electrical port, and a first water port;
   wherein the first interface device comprises a first guide element and at least one first locking element;
   wherein the second interface device comprises at least one of a second electrical port, and a second water port;
   wherein the second interface device comprises a second guide element and at least one second locking element;
   wherein the first interface device and the second interface device are configured complementary to each other, such that the at least one of a first electrical port, and a first water port, and the at least one of a second electrical port, and a second water port connect to each other in a connecting position;
   wherein the first guide element and the second guide element are configured to engage with each other to guide the first interface device and the second interface device into the connecting position;
   wherein the first locking element and the second locking element are configured to releasably lock each other to arrest the first interface device and the second interface device in the connecting position, and
   wherein the at least one first locking element comprises a latch, that protrudes from the first interface device.

2. The interface system of claim 1,
   wherein at least one of the at least one first locking element and the at least one second locking element is movable into an engagement position, and into an operation position,
   wherein the respective first locking element and the respective second locking element are configured to engage or disengage each other in the engagement position and to pull the first interface device and the second interface device towards each other when moving the respective locking element to the operation position.

3. The interface system of claim 2,
   further comprising an activation element attachable to the trolley,
   wherein the activation element is coupled with the at least one second locking element to move the second locking element.

4. The interface system of claim 3,
   wherein the activation element is a foot pedal of the trolley, which is coupled with the second locking element through a linkage.

5. The interface system of claim 1,
   wherein the second locking element comprises a movable catch configured to engage the first locking element.

6. The interface system of claim 1,
   wherein the first guide element and/or the second guide element comprises at least one guide pin, and wherein another of the first guide element and the second guide element comprises at least one recess for receiving the at least one guide pin.

7. The interface system of claim 1,
wherein the first ports protrude from the first interface device,
wherein the first interface device comprises guide pins as a first guide element, and
wherein the guide pins protrude further from the first interface device than the first ports.

8. The interface system of claim 1,
wherein the first interface device further comprises a wheel guide placeable at a bottom side of the monument, and
wherein the wheel guide is configured to receive and guide wheels of a respective trolley to at least pre-align the first interface device and the second interface device.

9. The interface system of claim 1,
wherein the first and second ports for water are quick connectors, which are self-closing.

10. The interface system of claim 1,
wherein the first interface device comprises elastic mounts for tolerance compensation.

11. A galley system of an aircraft, comprising:
at least one galley monument having at least one trolley parking space; and
at least one trolley insertable into the trolley parking space;
wherein the galley system further comprises the interface system according to claim 1,
wherein the first interface device is in the at least one trolley parking space,
wherein the second interface device is on the trolley,
wherein an installation height above a cabin floor of the first interface device and of the second interface device correspond to each other, and
wherein a lateral position of the first interface device in the trolley parking space and of the second interface device on the trolley match.

12. The galley system of claim 11,
wherein the trolley comprises at least one water tank and a dispensing unit,
wherein the at least one water tank is connected to a second cold water port and/or a second hot water port, and
wherein the dispensing unit is coupled with a battery coupled to the second electrical port.

13. The galley system of claim 11,
wherein the trolley parking space comprises a key block,
wherein the key block is in the trolley parking space in such a position that it blocks advancing of the trolley to the first interface device unless the trolley comprises a correspondingly positioned groove that allows the key block to pass along the groove.

14. An aircraft comprising at least one galley system according to claim 11.

15. An aircraft having a cabin comprising at least one interface system according to claim 1.

16. An interface system for cabin trolleys for a vehicle, comprising:
a first interface device attachable to a monument inside a cabin;
a second interface device attachable to a cabin trolley;
wherein the first interface device comprises at least one of a first electrical port, and a first water port;

wherein the first interface device comprises a first guide element and at least one first locking element;
wherein the second interface device comprises at least one of a second electrical port, and a second water port;
wherein the second interface device comprises a second guide element and at least one second locking element;
wherein the first interface device and the second interface device are configured complementary to each other, such that the at least one of a first electrical port, and a first water port, and the at least one of a second electrical port, and a second water port connect to each other in a connecting position;
wherein the first guide element and the second guide element are configured to engage with each other to guide the first interface device and the second interface device into the connecting position;
wherein the first locking element and the second locking element are configured to releasably lock each other to arrest the first interface device and the second interface device in the connecting position,
wherein the second interface device comprises at least one cover flap, that is swivably mountable on the trolley and is positionable into a closed and an opened position, and
wherein the at least one cover flap covers the second interface device in the closed position.

17. The interface system of claim 16, wherein the at least one cover flap is spring-loaded, such that it permanently urges into the closed position.

18. An interface system for cabin trolleys for a vehicle, comprising:
a first interface device attachable to a monument inside a cabin;
a second interface device attachable to a cabin trolley;
wherein the first interface device comprises at least one of a first electrical port, and a first water port;
wherein the first interface device comprises a first guide element and at least one first locking element;
wherein the second interface device comprises at least one of a second electrical port, and a second water port;
wherein the second interface device comprises a second guide element and at least one second locking element;
wherein the first interface device and the second interface device are configured complementary to each other, such that the at least one of a first electrical port, and a first water port, and the at least one of a second electrical port, and a second water port connect to each other in a connecting position;
wherein the first guide element and the second guide element are configured to engage with each other to guide the first interface device and the second interface device into the connecting position;
wherein the first locking element and the second locking element are configured to releasably lock each other to arrest the first interface device and the second interface device in the connecting position;
wherein at least one of the at least one first locking element and the at least one second locking element is movable into an engagement position, and into an operation position,
wherein the respective first locking element and the respective second locking element are configured to engage or disengage each other in the engagement position and to pull the first interface device and the second interface device towards each other when moving the respective locking element to the operation position, further comprising an activation element attachable to the trolley, wherein the activation element is coupled with the at least one second locking element to move the second locking element, and wherein the activation element is a foot pedal of the trolley, which is coupled with the second locking element through a linkage.

\* \* \* \* \*